United States Patent [19]
Gibbs

[11] 3,966,610
[45] June 29, 1976

[54] FILTER

[75] Inventor: Orville J. Gibbs, North Easton, Mass.

[73] Assignee: Bird Machine Company, Inc., South Walpole, Mass.

[22] Filed: Dec. 16, 1974

[21] Appl. No.: 533,338

[52] U.S. Cl............................ 210/203; 210/216; 210/328; 210/391; 210/400
[51] Int. Cl.² ........................................ B01D 33/02
[58] Field of Search ............... 209/173, 454–457; 210/203, 271, 272, 273, 328, 330, 332, 333, 391, 393, 400, 216

[56] References Cited
UNITED STATES PATENTS

| 1,687,863 | 10/1928 | Graham | 210/328 X |
|---|---|---|---|
| 2,034,784 | 3/1936 | Wallny | 210/391 X |
| 2,197,770 | 4/1940 | Pruyn | 210/271 X |
| 2,302,449 | 11/1942 | Laughlin | 210/271 X |
| 2,677,467 | 5/1954 | Giorgini | 210/203 X |
| 3,216,576 | 11/1965 | Roos | 210/328 |
| 3,552,572 | 1/1971 | Lehmann | 210/271 |

OTHER PUBLICATIONS

Taggart, Handbook of Mineral Dressing, 1950, pp. 11–04 to 11–23.

Primary Examiner—Charles N. Hart
Assistant Examiner—Robert H. Spitzer
Attorney, Agent, or Firm—Edgar H. Kent

[57] ABSTRACT

In filters of the type in which a cake of solids deposited from a liquid slurry thereof on a generally horizontal filter medium is subjected to treatment involving passage of liquid through the cake while on the filter medium, means is provided for increasing the drainage rate of the formed cake by causing the cake to form on the medium from the slurry fed thereto by gravity settling in the liquor of the slurry and by removing liquor of the slurry from above the cake while the liquor still contains unsettled fine particles.

8 Claims, 12 Drawing Figures

DIRECTION OF PANS

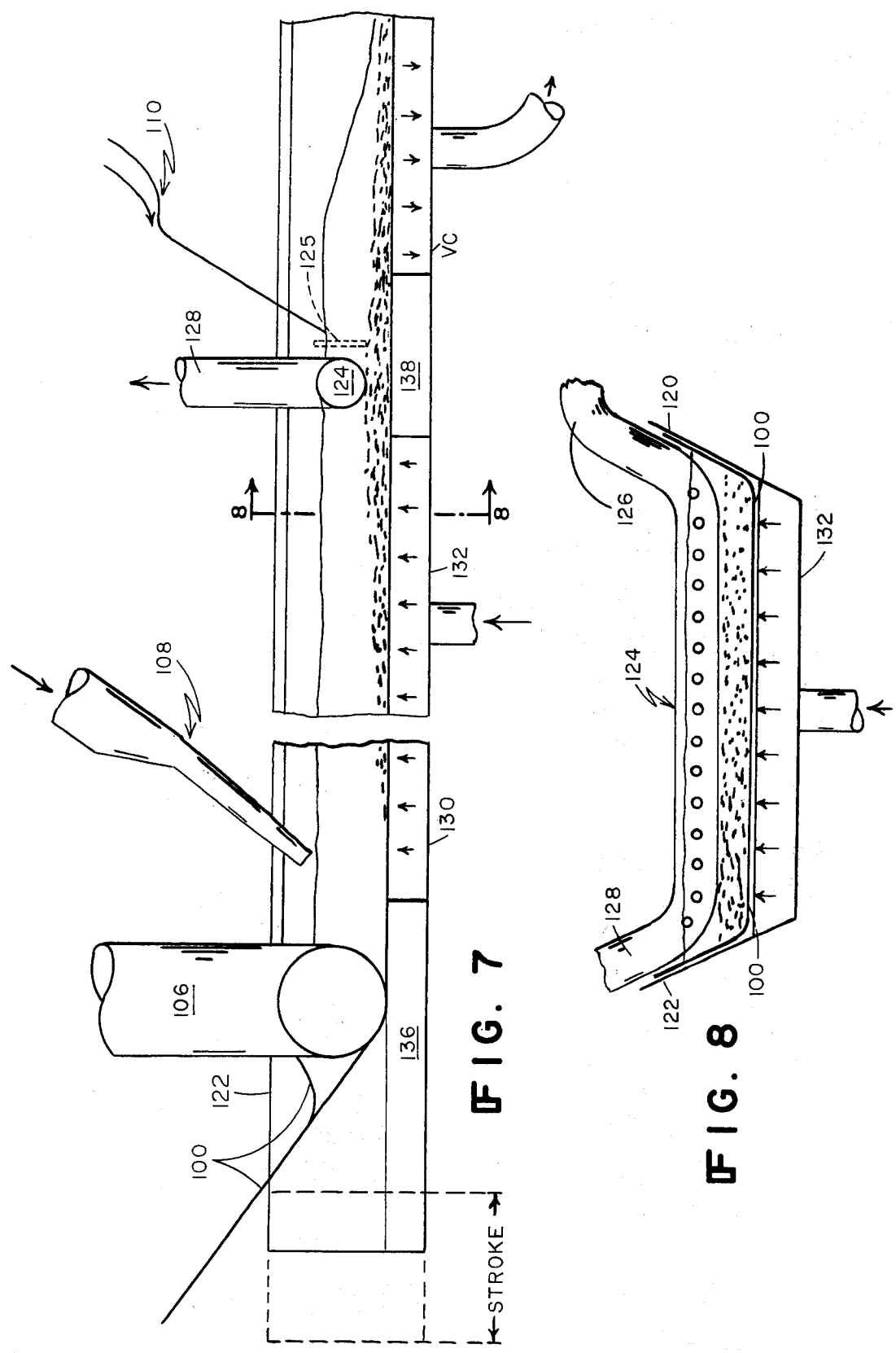

FILTER

BACKGROUND OF THE INVENTION

1. Field of the Invention

This invention relates to a liquid-solids slurry filter, more particularly such a filter of the type wherein a cake of solids deposited from the slurry on the filter medium, is subjected to one or more treatments, such as washing, involving the passage of liquid through the cake while it is retained on the filter medium.

2. Description of the Prior Art

Filters of the type concerned are typified by so-called horizontal rotary pan filters and belt filters. Filters of the first type have a horizontally disposed, generally circular array of pans with filters at their bottoms. Slurry fed to each pan is formed into a cake on each bottom filter by suction applied thereunder, wash water is applied to the cake and drawn through it by suction, usually several times, and the washed cake is finally removed, either by tilting the pan to dump it, or by scrapers. The array of pans is usually rotated about a vertical axis past the various feed and treating stations (see e.g. U.S. Pat. No. 2,684,158), but the pans may be stationary and the feed and wash equipment rotated about such axis (see e.g. U.S. Pat. No. 2,687,806).

In belt filters an endless belt carries the slurry generally horizontally over suction boxes from a feed station past cake wash and drying treatment stations. The belt may carry pans with filter bottoms (see e.g. U.S. Pat. No. 2,677,467) or the belt may constitute or comprise the filter medium, being formed to contain the slurry and cake through the aforesaid stages as the belt passes over the vacuum pans, which may be stationary (see e.g. U.S. Pat. No. 2,034,784), or may reciprocate along the belt path (see e.g. U.S. Pat. No. 2,997,179).

In utilizing such filters with many types of slurries which contain both fine and coarse particles difficulty is experienced in forcing the wash water through the formed cake, even with strong suction force applied. Pretreating the slurry as in centrifugal equipment to remove unwanted fines or "slimes" alleviates the problem to some extent but not fully, and slow drainage rate of cakes continues to slow the processing and production rates as well as producing wetter cakes than desired.

SUMMARY OF THE INVENTION

An object of this invention is to provide filters of the type concerned with means for increasing the drainage rate of cakes formed from slurry solids on the filter media thereof. Another object is to provide such means which can be readily and inexpensively incorporated in the designs of existing filters and which increases production rates and reduces operating costs by the increased cake drainage rate obtained.

It has been discovered that the foregoing objects are attained by the utilization of novel slurry applying and cake forming mechanism in which, instead of withdrawing the liquor of the slurry through the forming cake by suction as is conventional, means is provided for removing such liquor from above the cake formed of solids settling by gravity from the liquor, and while the liquor still contains relatively slow settling solids which are removed with it. The greatly improved cake drainage rates so obtained appear to show that a primary cause of slow drainage of cakes formed conventionally has been the formation of a thin, dense layer of primarily fine and slower settling solids on the upper surface of the cake which blinds the cake and impedes the subsequent suction of liquid therethrough.

While the slurry is being applied and the cake is forming, drainage of the slurry liquor through the forming layer is inhibited, for example by closing a valve in the outlet from a filter pan bottom or from a pan underlying a filter belt during this interval. In a preferred embodiment, means is provided for supplying liquid beneath and exposed to the filter medium at a greater pressure than the head of slurry over the filter, thus producing a gentle back flushing through the filter medium and the forming solids cake. Such backflushing means, which is the subject matter of U.S. patent application of applicant herein and another, Ser. No. 533,340, filed contemporaneously herewith, has been found to improve cake drainage by liquor removal from above the cake in accordance herewith, and so is disclosed also herein, although not a part of this invention nor essential to the utility of this invention.

The slurry liquor removal means according to the invention may take various forms, but is preferably arranged to siphon the liquor off from near the solids cake formed on the filter medium. Thus one or more generally horizontal suction tubes may be provided above and adjacent the filter medium in the slurry container which function to remove the liquor at the appropriate interval after the slurry has been supplied to the container. In rotary horizontal pan filters or belt filters carrying individual pans, the tube or tubes and suction connections are preferably movable to permit insertion of the tubes in and their removal from each pan successively to effect liquor removal at the proper time after the feed has been supplied thereto. In belt filters of the type that form the cake directly on the filter belt, the tube or tubes may be fixed at a desired location. Other removal means include means for tilting the pans of a horizontal rotary pan filter or a belt filter carrying individual pans sufficiently to pour off most of the slurry liquor above the cake, then returning the pans and cake to horizontal position.

The solid particles contained in the withdrawn slurry are usually mainly unwanted fines or slimes, so that the slurry can be discarded. If it is desired to separate such particles from the slurry liquor either for their value, or so that the liquor may be reused, or for both reasons, the slurry containing them may be subjected to filtration in equipment appropriate thereto.

BRIEF DESCRIPTION OF THE DRAWINGS

In the drawings:

FIG. 7 is a diagrammatic view in longitudinal section of a portion of the apparatus of FIG. 6.

FIG. 8 is a diagrammatic cross-section view on line 8—8 of FIG. 7.

BRIEF DESCRIPTION OF THE DRAWINGS

FIGS. 1 through 4 illustrate preferred structure according to the invention applied to a horizontal rotary tilting pan filter, which is otherwise of a conventional commercially available type such as shown in U.S. Pat. No. 2,684,158 aforesaid.

Figure 1:
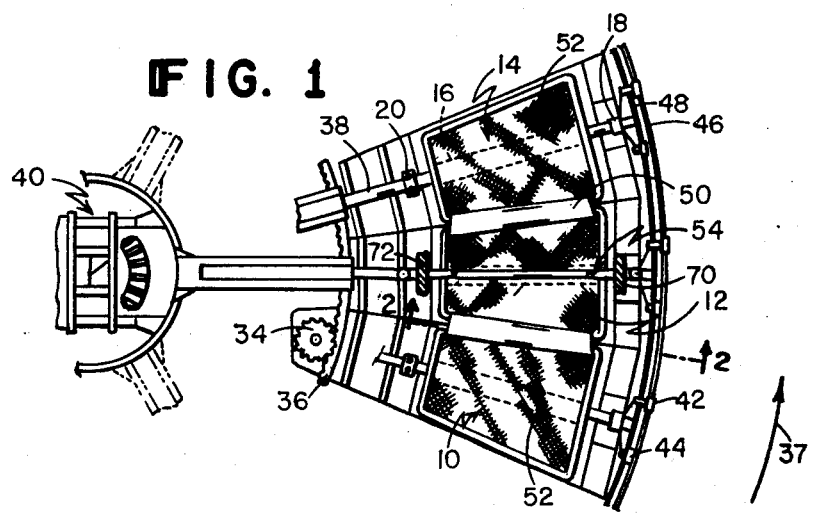
FIG. 1 is a partial plan view of a horizontal rotary pan filter of the tilting pan type, with structural changes according to the present invention.
Figure 2:
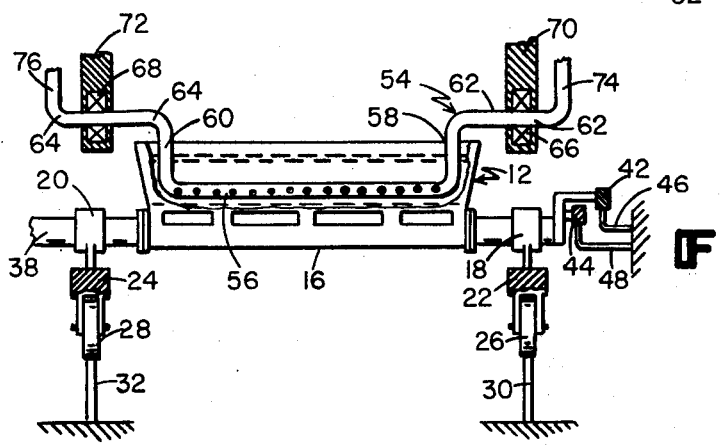
FIG. 2 is a vertical section view on line 2—2 of FIG. 1, broken away in part.

FIG. 1 shows only three of the circular array of filter pans of the filter, these being designated generally respectively 10, 12 and 14. The pans are each provided with a central drain pipe 16 at the bottom on which they are supported and which is rotatably mounted at its opposite ends in bearing sleeves 18 and 20. As shown in FIG. 2, sleeves 18 and 20 are supported on concentric support rings 22 and 24 having sets of wheels 26 and 28 mounted thereto by which they may be rotated about the central axis of the filter on concentric circular rails 30 and 32, respectively, fixed to underlying supporting structure. The cells are rotated about the filter axis in the direction of arrow 37 by motor-driven pinion 34 engaging circular rack 36 on the rotatable structure.

The pipes 16 are connected at their inner ends by flexible hoses 38 to a central valving control system 40, the outer part of which is connected to rotate with the pans about a stationary core. Each pan has fixed to the outer end of its pipe 16 a pair of cams 42 and 44 which ride on rails 46 and 48 attached to fixed structure such as posts surrounding the filter and which act on the cams to maintain the pans horizontal as in the positions shown in FIG. 1, and in other positions to turn pipes 16 to tip the pans as desired, including turning them upside down to dump the cake after washing has been completed. The structural arrangement of rails and cams to secure this action is well-known (see e.g. U.S. Pat. No. 3,389,800). The pans are oblong, larger at their outer than their inner ends and are provided with trailing sidewalls having turned over tops 50 which overlie the top of the leading sidewall of the next following pan to prevent spillage between the pans. They have filter media 52 secured to suitable supports (not shown) in their bottoms, the bottoms draining into pipes 16.

Control system 40 is arranged to connect hoses 38 to suction or to close them as desired. The pan 10 is assumed to be in a position following the feed position at which it has been charged with slurry by stationary feed means (not shown). At this position, as in the feed position and through the next following position in which pan 12 is shown, control system 40 would be normally arranged to connect the hoses 38 of pans 10 and 12 to a source of high vacuum or suction to drain off the liquor through the filter media and form the cake of extracted solids thereon. However, in utilizing the present invention vacuum is not applied in these positions and hoses 38 may be closed by control system 40. Hence in pans 10 and 12 the cake is forming on the filter media simply by settling of solids in their liquor. On the other hand, system 40 is arranged to apply suction to the hose 38 of pan 14, from which most of the liquor above the cake has been removed, while pan 14 was passing through the position of pan 12, by mechanism according to the invention now to be described, the remaining liquor in pan 14 thus being drawn off through the cake.

As best shown in FIG. 2, a generally U-shaped drain pipe designated generally 54 has an apertured base portion 56 slightly shorter than the pan length and end arms 58 and 60 extending substantially at right angles thereto which in turn have right angle extensions 62 and 64 rotatably received through bearings 66 and 68 in support arms 70 and 72 connected to fixed supporting structure (not shown) above the filter. Flexible hoses 74 and 76 connect drain pipe extensions 62 and 64 to a stationary source of suction, which may be controlled to open and close pipe 54 to suction in timed relation to the rotation of the filter. The location of bearings 66 and 68, which as shown in disposed centrally of the position of pan 12 in FIG. 1, and the length of pipe arms 58 and 60 are such that, in the position of the pans shown in FIGS. 1 and 2, base 56 of drain pipe 54 lies in the liquor of pan 12 with only small clearance above the solids cake on its filter medium, so that it draws off nearly all the liquor with suspended fine slow settling solids from above the cake.

Figures 3A, 3B, 3C:
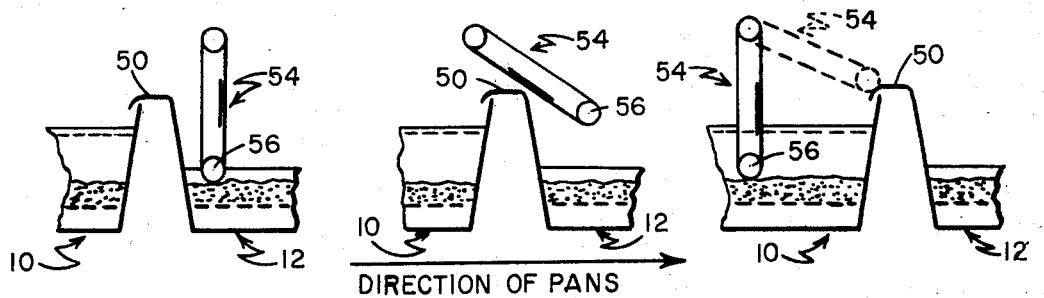
FIGS. 3A, 3B and 3C are diagrammatic views of portions of two of the pans of FIG. 1 at three different operating positions.

The flexibility of hoses 74 and 76 permits extensions 62 and 64 of suction pipe 54 to pivot in bearings 66 and 68 to effect insertion of pipe 54 in and its withdrawal from each pan. As shown, such pivoting is effected by the action of the trailing wall and its top 50 of each pan on pipe 54 as that wall is moved past the position of the pipe, this action being shown diagrammatically in FIGS. 3A, 3B and 3C. In FIG. 3A the pans have been rotated from their position of FIG. 1 so that drain pipe 54 is completing its drainage of liquor from above the cake in pan 12 and is about to contact the trailing sidewall of that pan. As shown in FIGS. 3B and 3C, continued rotation of the filter causes drain pipe 54 to be pivoted in the direction of filter rotation by engagement with the trailing wall of drained pan 12 (FIG. 3B) so that it rides over the top 50 of that wall (FIG. 3C, dotted lines) and then pivots under its weight in the opposite direction to drop into the drainage position in still full pan 10 (FIG. 3C, full lines).

While this action is taking place, the ports of the suction source connected to hoses 74 and 76 of drain pipe 54 may be automatically closed, as by cam action from the rotating filter structure. At the position of pan 12 in FIG. 3B, control system 40 applies suction to the hose 38 of pan 12 so that the small amount of liquor remaining is drawn off through the cake. As the pan moves on about the filter axis, washes are applied to and drained away through the cake, the cake is dumped, and the filter medium is washed, all as usual except that the utilization of the invention substantially reduces the time and space required for adequate cake drainage.

It will be appreciated that other means could be provided for alternately inserting the drain pipe 54 in, and removing it from, the pans. For example, cam action from the rotating filter, instead of actual contact with the pans, could be used to effect the pivoting shown, or such action could be used to operate a lift and drop mechanism to which the pipe is connected for opposite vertical movements to and from the pans. However, the arrangement shown is simple and satisfactory.

Figure 4:
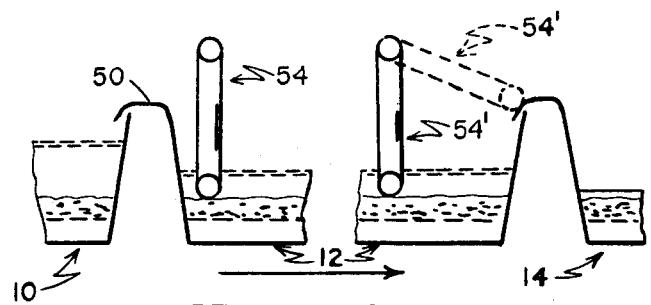
FIG. 4 is a diagrammatic view of portions of the pans of FIG. 1 at one of their operating positions, and illustrating a modification of certain mechanism of FIG. 1.

Depending on the rate of rotation of the filter and the amount of liquor to be removed from each pan by drain pipe 54, more than one such pipe may be needed. FIG. 4 illustrates diagrammatically the addition of a second such drain pipe 54', which may be of like construction and have like suction connections to those of pipe 54. As shown, pipe 54' is so located that it pivots into a pan as the pipe 54, having partially drained the pan, is about to be pivoted out of it, the position of the pans indicated in FIG. 3A. Further such additional drain pipes could, of course, be provided if needed.

Figure 5A:
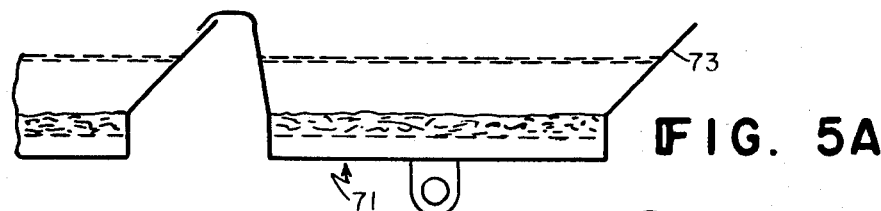
FIGS. 5A, 5B and 5C are diagrammatic views illustrating another modification of FIG. 1.
Figure 5B:
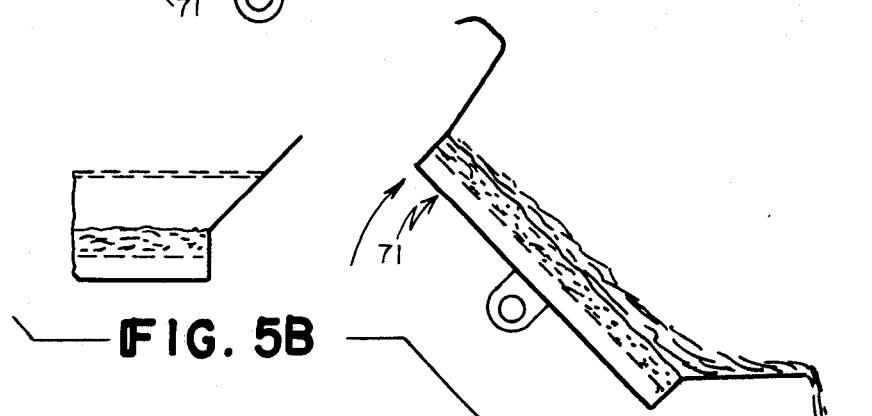
Figure 5C:
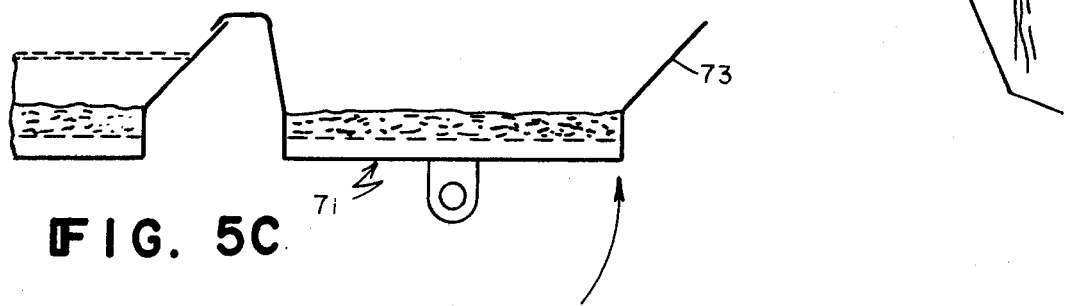

The modification illustrated in FIGS. 5A, 5B and 5C involves less added mechanism than is required in FIGS. 1 to 4, but generally will not effect as clean a separation of the undesired liquor with settling fine solids from the desired settled cake. In these Figures the pans, designated generally 71, are modified only to the extent that they have a more outwardly slanting leading sidewall 73 than the pans of the previous Figures, shown at about a 45° angle to the pan bottom. The rails opposite the liquor removal position of the pan 12 in FIG. 1 are also modified in known manner to produce by acting on cams 42 and 44, a tilting of each pan toward the direction of travel until its wall 73 is substantially horizontal as it passes from the position of pan 10 in FIG. 1 (FIG. 5A), through the position of pan 12 (FIG. 5B), and then to restore the pan to the horizontal position of pan 14 (FIG. 5C) for suction drainage. Tilting of the pan pours the liquor from above the cake over the wall 73 to a suitable underlying receiver (not shown). Control system 40 is usually modified to connect the hose 38 of each pan as it is tilted to a source of low suction, such as 1 or 2 inches Hg., to hold the cake in place on its filter medium.

Sufficient time should be provided between slurry feed to a pan and removal of the liquor from above its cake to permit settling of approximately all the desired, relatively fast settling solids. This time will be to some extent a variable with slurries of different solids current, but may be readily determined. Slurries of ores, phosphate rock or potash which are commonly subjected to filtration in equipment of the type concerned, may require settling periods of from five to twenty seconds or more. Thus the location of the liquor removal position of pan 12 in FIG. 1 and a pan 71 in FIG. 5B relative to the slurry feed position will depend upon this settling rate of the slurry being processed and the speed of rotation of the filter. Pan 10 in FIG. 1 may therefore be just leaving the fill position or may have traveled one or two pan widths beyond that position.

Belt filters of the type which carry individual pans are closely similar to the type of filter shown in FIG. 1 in that they carry the pans in an upright position generally horizontally successively past slurry feed and wash applying stations, while normally maintaining suction under the filter media in the pan bottoms to drain the liquid through the cakes on the media. The differences that the pans are of generally rectangular shape and travel in a straight path are not of consequence so far as the operation of the liquor removal mechanism of FIGS. 1 to 4 is concerned and such mechanism as shown, or modifications thereof previously suggested, can be equally utilized in such a belt filter, for example, such filters as shown in U.S. Pat. Nos. 2,570,697 and 2,677,467. In such filters, the pan bottoms may be readily closed to suction in the stages from feed to drain, as in the filter of FIG. 1. With such a filter it is also possible to cause one side of the belt or chains carrying the pans to travel over an elevation to tip the pans toward the opposite side and thus pour off the liquor above the cake in a manner similar to FIG. 5B.

In a filter of the type in which the pans are stationary and the feed and wash applying mechanisms rotate about the common axis, the supports 70 and 72 of pipe 54 of FIG. 1 can be carried by the rotating structure to operate in like manner. The pans would be closed to suction during feed and until the liquor has been removed by pipe 54, as in FIG. 1.

U.S. Pat. No. 3,262,574 discloses a rotary horizontal table filter wherein the slurry is retained on the filter media on the table by a belt surrounding the table. At a cake removal station the belt is moved away from the table side to enable cake removal by scraping off the opened side of the table. With such a filter, liquor removal mechanism like that of FIGS. 1 to 4 but fixedly mounted above the table can be utilized. As an alternative to removal by tipping as in FIG. 4B, two surrounding belts may be provided, a lower belt covering the table side up to cake level, and an upper belt covering the remainder of the table side up to fill level. To remove the liquor from above the cake, the upper belt is moved away for a sufficient interval to allow the liquor above the cake to flow out the opened table side and is then returned. For cake removal, both belts are moved away from the table side. A pool-forming dam should be provided between the feed zone and the liquor removal zone, which may be a suction pipe if one is used.

Figure 6:
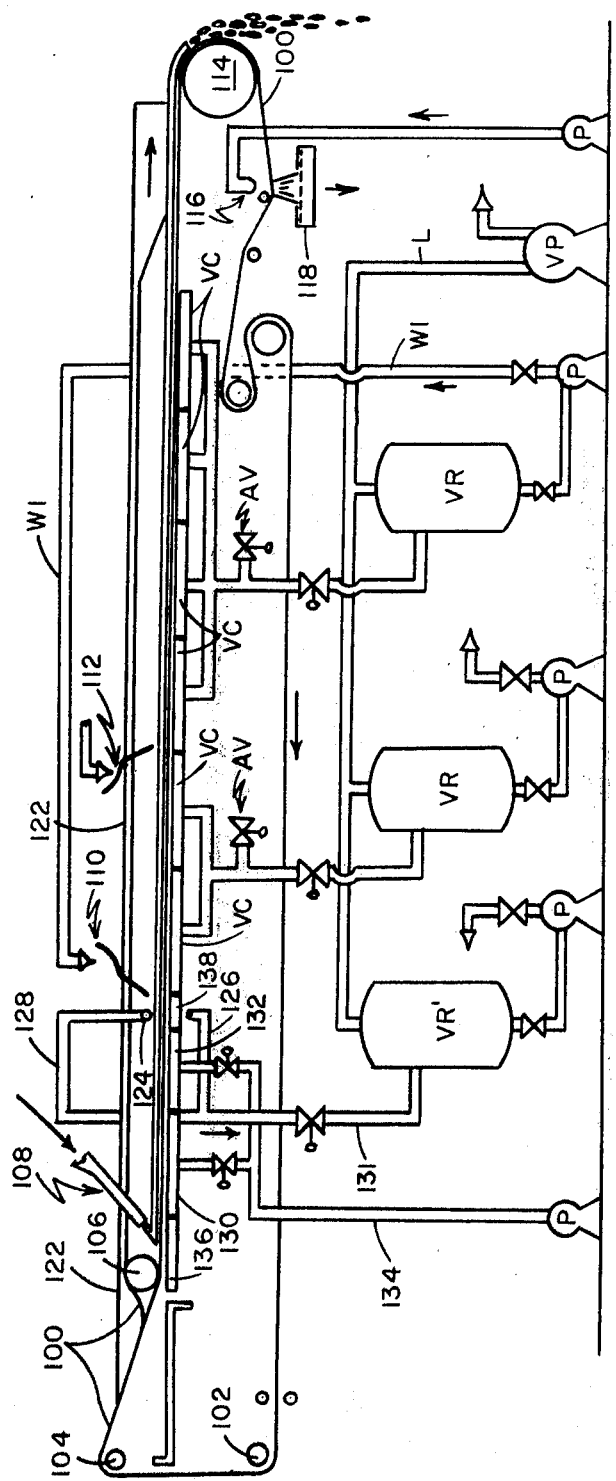
FIG. 6 is a partial schematic view of a belt filter with structural changes according to the invention.

FIGS. 6 to 8 illustrate schematically application of the invention to a belt filter of the type in which the cake is formed directly on a traveling filter belt, the belt being formed into a container during those stages in which slurry is being fed thereto and the cake is being treated with wash water. In this type of filter at least, it is preferred to utilize means for providing a low pressure backflow of liquid through the filter belt and the cake thereon from under the belt during the cake forming stages preliminary to removal of the liquor from above the cake, in accordance with the invention which is the subject-matter of the aforesaid patent application Ser. No. 533,340. Hence such means, although not part of this invention, is shown in these figures.

In FIG. 6 the belt 100, usually a composite of a filter cloth and a supporting apertured belt, is driven over rollers 102 and 104 at the lefthand end of the drawing, under a forming bar 106 and a slurry feed fishtail 108, under first and second wash water applying devices indicated symbolically at 110 and 112, respectively, over a drum 114 at the righthand end of the drawing where the cake is scraped off as indicated, past a washing spray header 116 and collecting pan 118 where the belt is washed through its underside, and over intermediate tension rollers back to the roll 102.

During its passage through the cake washing and draining stages the belt rides over supporting and liquid receiving suction compartments designated VC, provided with apertured top plates and connected at their bottoms by valved pipelines going to receivers designated VR, from the bottoms of which the water is extracted by pumps designated P and from the tops of which air is evacuated to maintain desired suction by a pump designated VP, to the suction side of which they are connected in series by a common pipeline L. A valved air vent designated AV is provided in the line from each compartment VC to its receiver VR. Countercurrent washing is provided by recycling the wash water from the second wash to the first wash applying mechanism through a pipeline designated W1.

From the area of bar 106 to the vicinity of drum 114, continuous sidewalls are provided designated 120 and 122 (see FIG. 8) and which may be integral with compartments VC. Forming bar 106 acts to turn the sides of the belt 100 up against sidewalls 120 and 122 to form the sides of a container, the initial or lefthand end of which is formed by bar 106. The far end of the container is formed by providing the belt path toward drum 114 with a slight upward tilt.

As so far described, the apparatus of FIG. 6 is conventional. The compartments under the belt may be stationary at least longitudinally of the belt, as in some commercially available filters of this type. However, the apparatus shown in FIG. 6 is of a different commercially available form in which all the compartments are driven in a cycle, in which they move in the direction of belt travel at the speed of the belt and are then returned to starting position at a faster speed and while suction connections thereto are closed (see e.g. U.S. Pat. No. 2,997,179). The pan drive for this cycle may be, for example, a pneumatic motor (not indicated in the drawings).

In accordance with the present invention, a perforated drain pipe 124 is stationarily mounted to extend across the channel between walls 120 and 122 for substantially the full width of the channel at a slight level above the cake formed on the belt before it reaches the pipe. Pipe 124 is located a sufficient distance beyond the slurry feed point to permit desired cake formation by settling as explained previously herein. The opposite ends of pipe 124 are connected by pipes 126 and 128 to valved pipe 131 connected to a suction receiver VR'. The liquor drained thereto from pipe 124 is extracted from the bottom of receiver VR' by a pump P and suction is applied thereto by a connection at the top to line L from the suction side of pump VP.

Pipe 124 forms a dam for the liquor above the cake so that a pool of such liquor is formed between pipe 124, sidewalls 120 and 122 and forming bar 106. Pipe 124 is located just ahead of the point of first wash application through 110, this tending to equalize the hydraulic pressure at opposite sides of pipe 124 and to prevent short circuiting of liquor under the pipe 124. It may be desirable to provide, as a supplementary dam, a thin flexible strip such as rubber, indicated by dash lines at 125 in FIG. 7, extending between sidewalls 120 and 122 and between pipe 124 and wash feeder 110 from above liquid level to a position just clearing or wiping the upper surface of the cake.

In the conventional construction, suction compartments VC connected to a receiver VR are provide below the belt in the zone occupied by the aforesaid pool. In the present construction, there are provided two compartments 130 and 132 which have valved connections at their bottoms to a pipe 134 through which water under pressure is supplied by a pump P, and two "blank" sections 136 and 138. Section 136 precedes compartment 130 in the direction of belt travel while section 138 extends between container 132 and the first suction compartment VC. Sections 136 and 138 are provided with closed tops; whereas, compartments 130 and 132 have perforated tops like the vacuum compartments VC so that water under pressure received therein will flow upwardly through belt 100 and the solids cake forming thereon, as indicated by the upwardly directed arrows in these compartments.

In operation, the compartments VC, 130 and 132 and sections 136, 138 are reciprocated longitudinally of the belt path, the stroke length being indicated by dotted lines at the left in FIG. 7, with the stroke in the forward direction of belt travel about two-thirds completed. In this direction of stroke, suction is applied to compartments VC and water under pressure is applied to compartments 130 and 132, as indicated by the arrows therein in FIG. 7. During the return stroke, the valves in the suction lines to compartments VC are closed to prevent adherence of the belt to their tops due to suction. It may also be desirable to close the valve in line 134 to compartments 130 and 132 during this period, although this is not needed so far as concerns adherence of the belt thereto.

It will be noted that blank section 138 is slightly wider than the length of the stroke, and is positioned so that at the end of the reverse stroke, the first suction compartment VC is spaced beyond pipe 124 in the direction of belt travel. This inhibits short circuiting of liquor under pipe 124 into this suction compartment at the start of the forward stroke, under the influence of the suction then applied to that compartment. Section 138 is also sufficiently wide to prevent short circuiting of liquid from compartment 132 into the first compartment VC. Section 136 prevents liquid flow through the belt area it underlies during the stroke in both directions, as does section 138.

As the belt moves from the slurry feed means 108 to suction pipe 124, the faster settling solids settle out in the pool between bar 106 and pipe 124 while the slower settling fine solids remain in suspension in the liquor, so that they are withdrawn with the liquor above the cake by suction pipe 124, as in the embodiments previously described. The backflow of liquid under pressure from compartments 130 and 132 through the belt and cake is preferred since this has been found to improve the effectiveness of removal of fine particles by pipe 124, as set forth in aforesaid application Ser. No. 533,340. This greater effectiveness is demonstrated by better drainage rates of cakes when such backflow is utilized. However, backflow can be omitted and compartments 130 and 132 can be connected to drains (but not suction) or replaced by blank sections. The backflow pressure when used should be low and such as to provide a pressure of the order of two to six inches of water above the hydrostatic head of the pool of liquor over the belt.

Backflushing through the filter medium and cake during settling is also desirable in the horizontal rotary and belt pan filter embodiments previously described. Belt pan filters normally carry the pans over suction containers like containers VC of FIG. 6 to which the undersides of their filter media are exposed during the feed, wash and drain periods. Hence, such filters to which the means of the present invention are applied can also be modified, as the filter of FIG. 6 is modified, to provide backflushing by supplying water under pressure instead of suction to containers underlying the pans from the point of feed to the location of the liquor removal means. In horizontal rotary pan filters, the suction system under each pan is filled with liquid under pressure during slurry feed and until liquor removal, after which the liquid is drained from the pan suction system, as set forth in the aforesaid patent application.

As with the previously described embodiments, more than one suction 124 may be utilized, which may be in series located at the same level or at different levels, or may be located one on the other at different levels. In filters of the type shown in FIGS. 6 to 8 in which the container system under the belts is not moved longitudinally of the belt, section 138 can be of considerably reduced width and section 136 can be eliminated.

Tests have demonstrated that the provision of means for removing fines-containing slurry liquor from above the cake in accordance with the present invention greatly increases the drainage rates of cakes formed from slimes-containing slurries in filters of the type concerned. For example, by siphoning off the liquor and suspended fines near the cake level, the drainage rates of 1½ to 2 inch thick cakes formed from phosphate rock slurry have been increased to several times faster than the drainage rate of cakes of like thickness of the same slurry formed in the conventional manner by suction under the filter medium. Such improvement was obtained despite pretreatment of the slurry to remove slimes. When backflow of liquid through the cakes was utilized, the effectiveness of slimes removal was improved such that at least as much increase in cake drainage rate was obtained by the liquor removal from such slurries that had not been so pretreated. Most of the liquor above the cake should be removed, since the improvement diminishes rapidly as the amount of liquor removed is reduced, the difference being more noticeable without backflow than with it.

The increased cake drainage rates obtained much more than compensate for any increased time and space needed for initially forming the cake by settling instead of by conventional suction-forming. It therefore becomes possible to increase the speed and output of the filter or to reduce its size for the same output, with important savings.

I claim:

1. In a filter for solids-liquid slurry of the type which includes feed means for feeding the slurry into a plurality of individual pans containing a filter medium while the pans are in substantially horizontal position, suction means for removing liquid through said medium in said pans, cake treating means for applying treating liquid to a cake of solids formed on said medium in said pans, and moving means for relatively moving said pans and the aforesaid means to subject said pans successively to the action of said feed means and said suction means and of said treating means and said suction means;

the improvement for treating slurry containing solids particles of which a portion of relatively fine size settles more slowly in the slurry liquor under the force of gravity than the remainder, which comprises the combination of:

means operative upon feeding of slurry to each pan and prior to the action of said suction and cake treating means thereon to inhibit drainage of slurry liquor through said medium in said pan for a time interval sufficient to permit a cake of solids to form on said medium by settling in said liquor; and removal means operative prior to the action of said suction and cake treating means on each pan to remove slurry liquor from above the so-formed cake therein while said liquor contains unsettled particles of said relatively fine size portion.

2. A filter according to claim 1 wherein said removal means is arranged to remove said liquor from adjacent the upper surface of said cake.

3. A filter according to claim 1 wherein said removal means comprises a suction pipe with an inlet arranged to be disposed in a position with said inlet above and adjacent the level of cake to be formed on said medium in said pans, and means for alternately inserting said pipe to, and withdrawing it from, said position in said pans.

4. A filter according to claim 1 wherein said removal means tips said pans to remove said liquor.

5. In a filter for solids-liquid slurry of the type which includes feed means for feeding the slurry onto an endless filter medium while the medium is in substantially horizontal position, suction means for removing liquid through said medium, cake treating means for applying treating liquid to a cake of solids formed on said medium, and moving means from relatively moving said medium and the aforesaid means to subject said medium successively to the action of said feed means and said suction means and of said treating means and said suction means;

the improvement for treating slurry containing solids particles of which a portion of relatively fine size settles more slowly in the slurry liquor under the force of gravity than the remainder, which comprises the combination of:

means operative upon feeding of slurry to said medium and prior to the action of said suction and cake treating means thereon to inhibit drainage of slurry liquid through said medium for a time interval sufficient to permit a cake of solids to form on said medium by settling in said liquor; and removal means operative prior to the action of said suction and cake treating means to remove slurry liquor from above the so-formed cake while said liquor contains unsettled particles of said relatively fine size portion.

6. A filter according to claim 5 wherein said removal means is arranged to remove said liquor from adjacent the upper face of said cake.

7. A filter according to claim 6 which includes container means comprising impervious sidewalls having sealing engagement with opposite sides of said medium, said removal means comprises siphon means extending between said sidewalls with an inlet disposed above and adjacent the level of cake to be formed on said medium, said feed means is arranged to feed said slurry to said medium between said sidewalls, and said moving means moves said medium in the direction from said feed means to said removal means.

8. A filter according to claim 7 wherein said filter medium is a belt.

* * * * *

UNITED STATES PATENT AND TRADEMARK OFFICE
CERTIFICATE OF CORRECTION

PATENT NO. : 3,966,610
DATED : June 29, 1976
INVENTOR(S) : Orville J. Gibbs

It is certified that error appears in the above–identified patent and that said Letters Patent are hereby corrected as shown below:

Column 2, line 43, delete "the" and add --such--;

Column 4, line 13, delete "in" and add --are--;

Column 6, line 12, "4B" should be --5B--;

Column 7, line 45, "provide" should be --provided--;

Column 10, line 21, delete "from" and add --for--.

Signed and Sealed this

Fourteenth Day of September 1976

[SEAL]

Attest:

RUTH C. MASON
Attesting Officer

C. MARSHALL DANN
Commissioner of Patents and Trademarks